(12) United States Patent
Wiening et al.

(10) Patent No.: US 10,108,761 B2
(45) Date of Patent: Oct. 23, 2018

(54) PREDICTIVE SIMULATION

(71) Applicant: Dassault Systemes SolidWorks Corporation, Waltham, MA (US)

(72) Inventors: Jonathan Wiening, Providence, RI (US); Marlon Banta, Waltham, MA (US); Stephen Endersby, Waltham, MA (US)

(73) Assignee: DASSAULT SYSTEMES SOLIDWORKS CORPORATION, Waltham, MA (US)

( * ) Notice: Subject to any disclaimer, the term of this patent is extended or adjusted under 35 U.S.C. 154(b) by 815 days.

(21) Appl. No.: 14/486,654

(22) Filed: Sep. 15, 2014

(65) Prior Publication Data
US 2016/0078156 A1    Mar. 17, 2016

(51) Int. Cl.
*G06F 17/50*    (2006.01)

(52) U.S. Cl.
CPC .......... *G06F 17/5009* (2013.01); *G06F 17/50* (2013.01); *G06F 2217/04* (2013.01)

(58) Field of Classification Search
CPC ...................................... G06F 17/5009–17/504
See application file for complete search history.

(56) References Cited

U.S. PATENT DOCUMENTS

| | | | | |
|---|---|---|---|---|
| 4,967,386 A * | 10/1990 | Maeda | ............. | G05B 19/41885 703/17 |
| 2004/0024624 A1 * | 2/2004 | Ciscon | ................ | G06F 17/5004 705/301 |
| 2010/0106466 A1 * | 4/2010 | Frohlich | ............. | G06F 17/5086 703/2 |
| 2012/0109592 A1 | 5/2012 | Potter et al. | | |
| 2014/0046635 A1 * | 2/2014 | Kersh | ................ | G06F 17/5009 703/1 |
| 2014/0046733 A1 * | 2/2014 | Grichnik | ............. | G06F 17/5009 705/7.37 |
| 2014/0100786 A1 * | 4/2014 | Ma | ......................... | G01V 1/288 702/16 |
| 2014/0303949 A1 * | 10/2014 | Boneti | ................ | G06F 17/5009 703/6 |

(Continued)

FOREIGN PATENT DOCUMENTS

WO    WO 2007/079759    7/2007

OTHER PUBLICATIONS

Dassault Systemes, "What's New in Solidworks 2011" (2011), pp. 1-6 [retrieved from http://help.solidworks.com/2011/English/WhatsNew/AllContent/SolidWorks/NonCore/SWSimulation/wn_2011/SCR_Beta/c_Improved_Probe_Callouts.html?id=6a1fc0eb146f4e2285e751812700ae53#].*

(Continued)

*Primary Examiner* — Brian W Wathen
(74) *Attorney, Agent, or Firm* — Hamilton, Brook, Smith & Reynolds, P.C.

(57) ABSTRACT

A method of executing a simulation model while generating an associated structural model includes changing, by a computer-aided design (CAD) system, the structural model. The method further includes evaluating, by the CAD system, at least one trigger criterion to determine if the change to the structural model is a simulation trigger event. The method also includes executing, by the CAD system, the simulation model if the change to the structural model is determined to be the simulation trigger event.

19 Claims, 7 Drawing Sheets

(56) References Cited

U.S. PATENT DOCUMENTS

2015/0234944 A1* 8/2015 Marceau ................ H04L 67/12
703/1
2015/0242547 A1* 8/2015 Phadke ............... G06F 17/5009
703/2

OTHER PUBLICATIONS

Mathworks, "Virtual Reality Modeling Language (VRML)" (Apr. 28, 2013), pp. 1-5 [retrieved from https://web.archive.org/web/20130428004408/https://www.mathworks.com/help/sl3d/vrml.html].*

Bruzzone, L., et al., "The Design of a Robotic Equipment for Deep-Sea Maintenance Operations", vol. PD-82; pp. 113-120; Jul. 10, 2000.

Sohrt, W., et al. , "Interaction with constraints in 3D modeling", SMA '91 Proceedings of the First ACM Symposium on Solid Modeling Foundations and CAD/CAM Applications, ACM, New York, USA, pp. 387-396, Jun. 5, 1991.

Weber, D., et al. "Rapid CFD file die fruhe konzeptionelle Design Phase", pp. 68-78; Mar. 31, 2012.

European Search Report for EP 15 18 5145 dated Jan. 28, 2016 entitled "Predictive Simulation".

* cited by examiner

PREDICTIVE SIMULATION

BACKGROUND OF THE INVENTION

Two components of a product design workflow include (A) design capture using, for example, a Computer Aided Design (CAD) system, and (B) simulation of the captured design. Existing approaches to design simulation require the user to explicitly invoke the simulation once the user determines that the design has progressed enough to warrant simulation results. In order to do so, the user needs to take specific action—the user must manually switch from the CAD application to a simulation application, and invoke a simulation run through the simulation application. Once the simulation is complete, the user must again take action to view the simulation results and determine whether there are any interesting conclusions to be drawn from the results. All of these discrete steps take the user away from his core interest of creating and refining the product design.

SUMMARY OF THE INVENTION

The described embodiments are directed to automatically running simulations that are initiated when a user makes modeling changes on a CAD system. The following are elements of an example operation according to the described embodiments. (A) A user sets up a structural model on a CAD system. (B) The user sets up the simulation model corresponding to the design model. (C) The user makes modifications to the structural model. (D) Software automatically runs simulations associated with each CAD modification, and makes relevant simulation results available to the user, including pass/fail information based on targeted criteria. (E) The user uses the readily available simulation results to guide design improvements.

The key to the approach of the described embodiments, an example of which is presented above, is to automatically run simulations using available computational resources following CAD modifications. As a result, the user does not need to make a decision or take action to re-run the simulation, because the simulation is automatically re-run based on CAD modifications. Further, the user does not need to take action to view the simulation results, because the described embodiments present the relevant simulation results information to the user automatically in a clear and unobtrusive way. The user does not need to determine if any interesting conclusions can be drawn from the results, because the described embodiments extract relevant simulation results from the results automatically and show the relevant results to the user in a clear and unobtrusive way.

In one aspect, the invention may be a method of executing a simulation model while generating an associated structural model. The method, performed by a computer-aided design (CAD) system, includes changing the structural model, evaluating at least one trigger criterion to determine if the change to the structural model is a simulation trigger event, and executing the simulation model if the change to the structural model is determined to be the simulation trigger event.

One embodiment further includes presenting, upon completion of the execution of the simulation model, results of the execution. The results of the execution may include a summary result, and the summary result may expand to a detailed result upon input from a user.

In one embodiment, changing the structural model is based on one or more instructions from an instruction set of the CAD system. In another embodiment, the simulation trigger event includes completing construction of the portion of the structural model. The simulation trigger event may include one or more geometry changes. In one embodiment the executing begins at a time based on when an Nth trigger event occurs, where N is an integer. In another embodiment, the executing begins at a time based on when an Nth geometry change occurs, where N is an integer.

One embodiment further includes controlling the simulation model according to a set of predetermined rules. The set of predetermined rules may relate to when the simulating should end. Another embodiment further includes managing simulation results produced by executing the simulation model.

In another aspect, the invention may be a computer-aided design (CAD) system, including a schematic capture processor configured to change a structural model. The system further includes a simulation processor configured to (A) evaluate at least one trigger criterion to determine if the change to the structural model is a simulation trigger event and (B) execute the simulation model if the change to the structural model is determined to be the simulation trigger event, beginning at a time based on the trigger event.

In one embodiment, the simulation processor is further configured to present, upon completion of the execution of the simulation model, results of the execution. In another embodiment, the results of the execution include a summary result, and wherein the summary result expands to a detailed result upon input from a user. In one embodiment, a change to the structural model is based on one or more instructions from an instruction set of the CAD system.

In another aspect, the invention may be a non-transitory computer-readable medium with computer code instruction stored thereon. The computer code instructions, when executed by an a processor, cause a computer-aided design (CAD) system to (A) change a structural model, (B) evaluate at least one trigger criterion to determine if the change to the structural model is a simulation trigger event and (C) execute a simulation model associated with the structural model if the change to the structural model is determined to be the simulation trigger event.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The described embodiments are directed to simulations that are run automatically, initiated by modeling changes made on a CAD system.

An element of the described embodiments is the automatic execution of simulations using available computational resources following CAD modifications. As a result, the user does not need to make a decision or take action to re-run the simulation, because the simulation is automatically re-run based on CAD modifications. Further, the user does not need to take action to view the simulation results, because the described embodiments present the relevant simulation results information to the user automatically in a clear and unobtrusive way. The user does not need to determine if any interesting conclusions can be drawn from the results, because the described embodiments extract relevant simulation results from the results automatically and shows the relevant results to the user in a clear and unobtrusive way.

In an example embodiment of the invention, a user (i.e., a product designer such as an engineer or technician) wishes to design and evaluate a product. The user creates a structural model of the product on a CAD system. The user also creates a behavioral model that describes the behavior of the structural model.

The design process may be iterative, where the user builds the structural model on the CAD system until it reaches a certain developmental stage, then the user evaluates the structural model by executing a simulation based on the corresponding behavioral model. The results of the simulation may be used to guide modifications and improvements to the structural model. This iterative operation (i.e., design, simulate, revise, simulate, revise, simulate, etc.) may continue until the simulated performance of the model is satisfactory.

The described embodiments may automatically execute simulations associated with trigger events. In one embodiment, such trigger events may include any CAD modification, regardless of type. Other embodiments may restrict trigger events to particular CAD modifications, such as a geometry change to the structural model. Some embodiments may further restrict the trigger event to particular geometry changes, such as adding a fillet or a hole.

Some embodiments may execute a simulation after a certain number of trigger events have occurred. For example, the described embodiments may execute a simulation after every n geometry changes, where n is an integer.

The described embodiments may submit several simulations for solution simultaneously, utilizing available computational resources (e.g., local, remote, cloud) with increasing fidelity. Examples may include the following: (A) Basic free frequency analysis; (B) Linear static with course mesh; (C) Linear static with refined mesh; and (D) Nonlinear static with refined mesh.

The described embodiments may automatically make relevant simulation results available to the user. The simulation results may include pass/fail information based on predetermined, targeted criteria. In one embodiment, the simulation results are shown in an inset view (i.e., thumbnail view) within the working window of the graphical user interface (GUI) presented to the user. The simulation results may include a key result plot and a pass/fail visual indication. The key result plot may include all of the features and indications available in a simulation output known to one skilled in the art.

Once a simulation completes, a thumbnail view of the key results of the simulation may be shown immediately inside the user's working window. The user may select a thumbnail (with a mouse/curser selection tool or other selection tool or technique known in the art) to cause the thumbnail to expand to a more detailed view of the result plot. A user therefore does not need to switch applications to view simulation results. The described embodiments present simulation results automatically as unobtrusive notifications in the context of the current working window.

Figure 1:
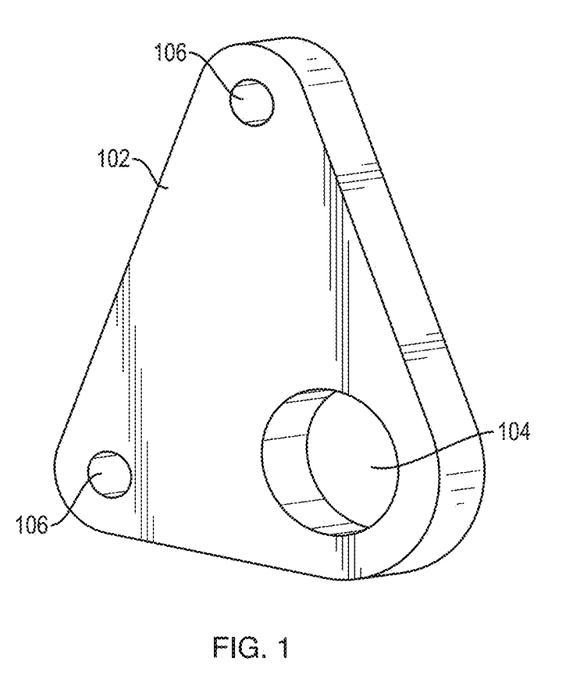
FIG. 1 illustrates the result of a user setting up the initial structural model of a product according to one aspect of the invention.

FIGS. 1-7 indicate an example product design workflow according to the present invention. FIG. 1 illustrates the result of a user setting up the initial structural model 102 of a product, which in this case is a triangular bracket with one large hole 104 and two smaller holes 106.

Figure 2A:
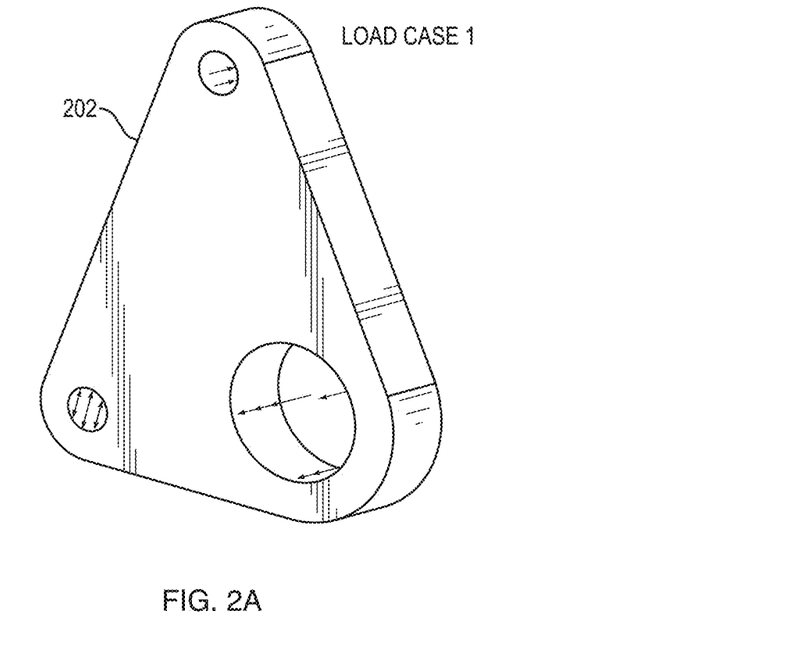
FIGS. 2A and 2B show views of the user in the process of setting up the simulation model corresponding to the structural model according to one aspect of the invention.
Figure 2B:
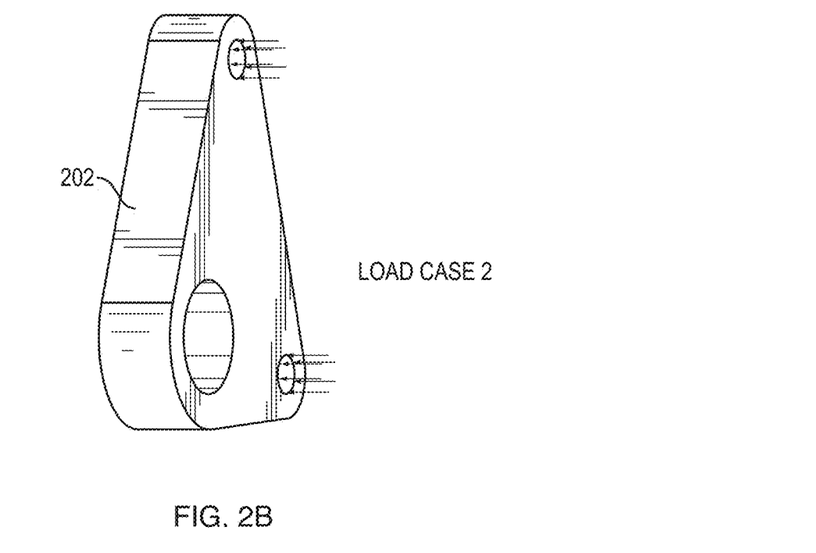

FIGS. 2A and 2B show views of the user in the process of setting up the simulation model 202 corresponding to the structural model 102 (shown in FIG. 1). The simulation model can have multiple load cases. Two load cases are shown for this example; one in FIG. 2A and one in FIG. 2B. The user runs initial simulations using however many load cases have been initialized.

Figure 3:
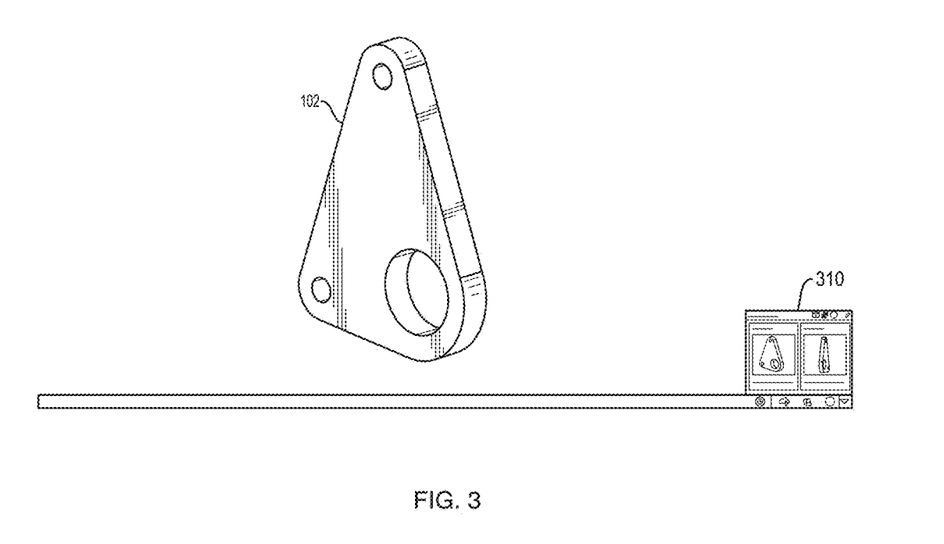
FIG. 3 illustrates a view of the user continuing to work on and modify the structural model of FIG. 1 on the CAD system.
Figure 4:
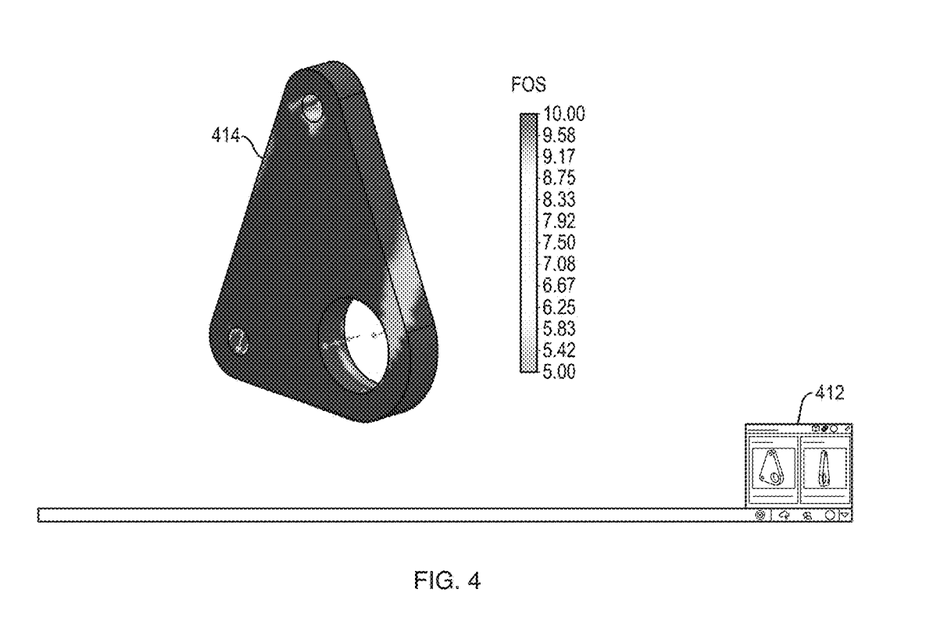
FIG. 4 shows an example of complete simulation results.

FIG. 3 illustrates a view of the user continuing to work on and modify the structural model 102 on the CAD system. One or more thumbnail views of the simulation status 310 are available on the GUI simulation window of the CAD system (in the lower right corner in this example). The user can select (e.g., click on with a mouse or other selection device) the thumbnail 310 at any time to expand the thumbnail and view the complete simulation results 414, which are depicted in FIG. 4. A revised thumbnail 412, similar to the thumbnail 310 of FIG. 3, is available in the complete simulation results view. This revised thumbnail 412 may provide information about other aspects of the simulation or about other load cases.

Figure 5:
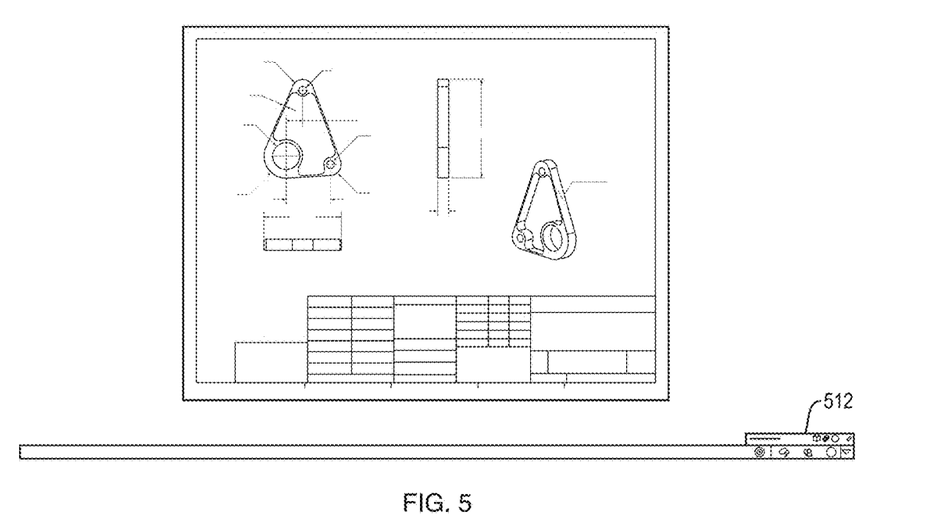
FIG. 5 shows example drawing tools.
Figure 6:
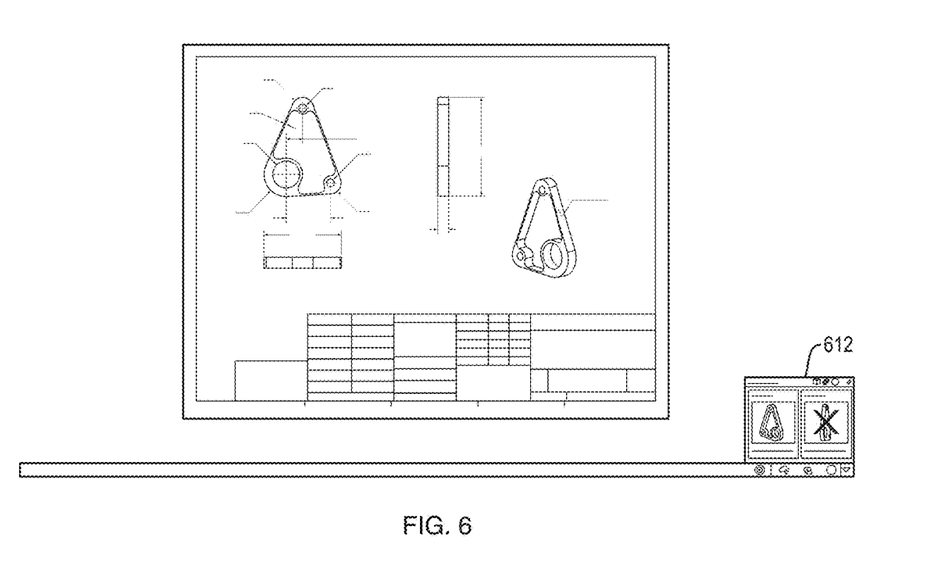
FIG. 6 shows the example drawing tools of FIG. 5 with a thumbnail indicating complete simulation.

The user may continue to make revisions to the structural model using any available CAD tools, such as the drawing tools shown in FIG. 5. The described embodiments automatically run simulations following CAD modifications (or upon trigger events defined by the user). Simulation status thumbnails 512 are continuously available to the user and up to date with respect to the CAD modifications. As shown in FIG. 6, the thumbnail simulation results 612 indicate to the user when simulations are completed, and whether or not the simulated model violates predefined design constraints.

Figure 7:
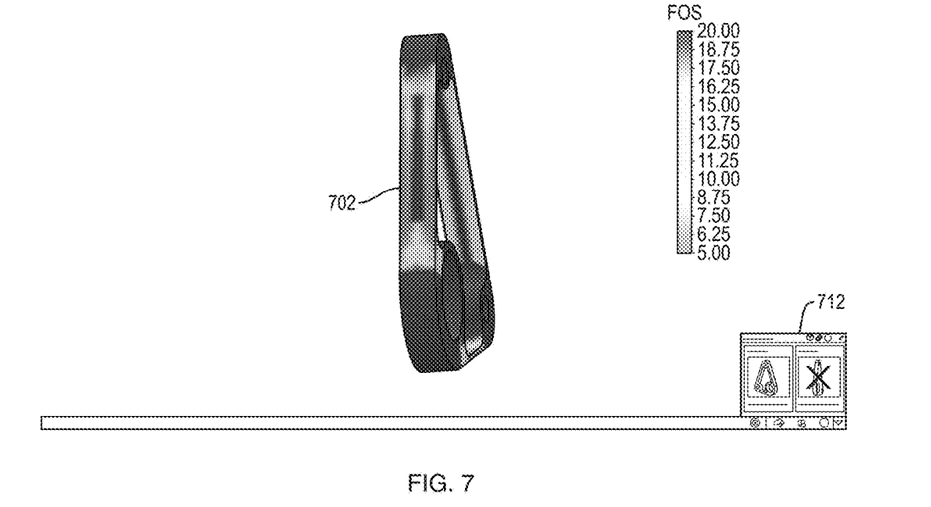
FIG. 7 shows another example of complete simulation results.

At any time, the user can select any of the simulation thumbnails to view the current simulation results. FIG. 7 illustrates a view of complete simulation result 702 for one of the loading cases. Using the thumbnail 712, the user can alternate between any of the available simulation results.

If simulations are still running while the user continues to work on the CAD system, and substantial CAD changes have been made in the interim, execution rules can be set to manage the still-running simulations. A few examples illustrating the kinds of execution rules that may be employed include (A) run all in-process simulations to completion, (B) run only simulations likely to finish in the next N seconds, where N is an integer, and (C) Stop all in-process simulations.

Simulation results may be managed according to a set of management options or rules. A few examples illustrating the kinds of management options/rules that may be employed include (A) remove lower-fidelity models and/or simulation results once higher-fidelity models become available; (B) save at least the highest fidelity simulation result for each simulation run for reference; and (C) remove simulation results when the results become out of date.

The described embodiments facilitate efficient utilization of available compute resources. The described embodiments execute simulations in the background, in many cases using available computational resources that would otherwise be idle. The use of cloud computing or other compute clusters may greatly accelerate simulation turnaround time.

Figure 8:
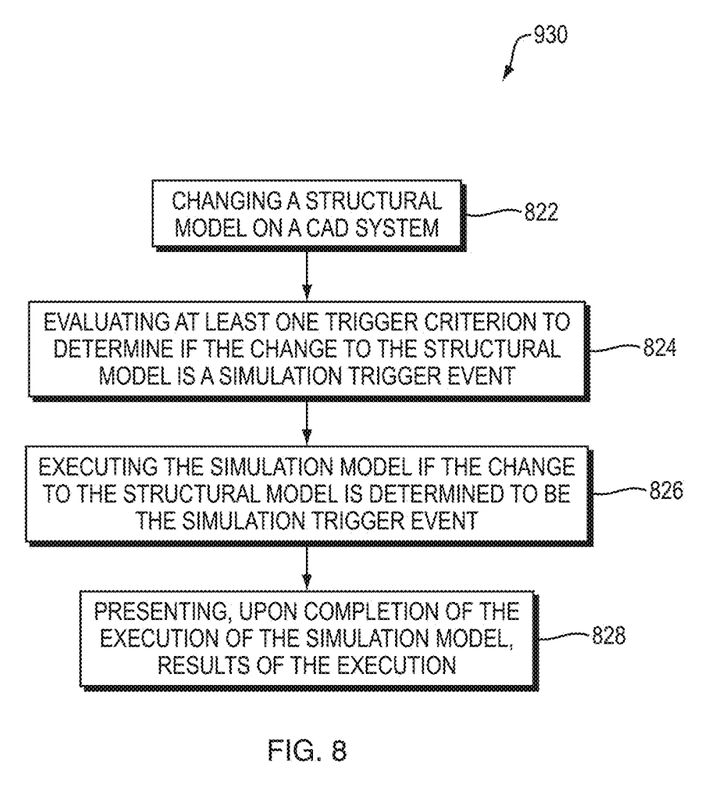
FIG. 8 illustrates an example procedure to design a product model according to the described embodiments.

FIG. 8 illustrates an example procedure to execute a simulation model while constructing or revising an associated structural model, according to the described embodiments. A user of a CAD system changes 822 a structural model on a CAD system, generally by sitting at a CAD system and entering information about a change to a product component. The information may be entered, for example, by entering keyboard strokes or through another data entry device such as a computer mouse or touchscreen. The change may be an initial element of the structure model, or a revision to an existing structural model. The CAD system evaluates 824 one or more trigger criteria to determine if the change to the structural model is a simulation trigger event. The CAD system executes 826 a simulation model if the change to the structural model is determined to be the simulation trigger event. Results of the execution are presented 828 upon completion of the execution of the simulation model.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

Figure 9:
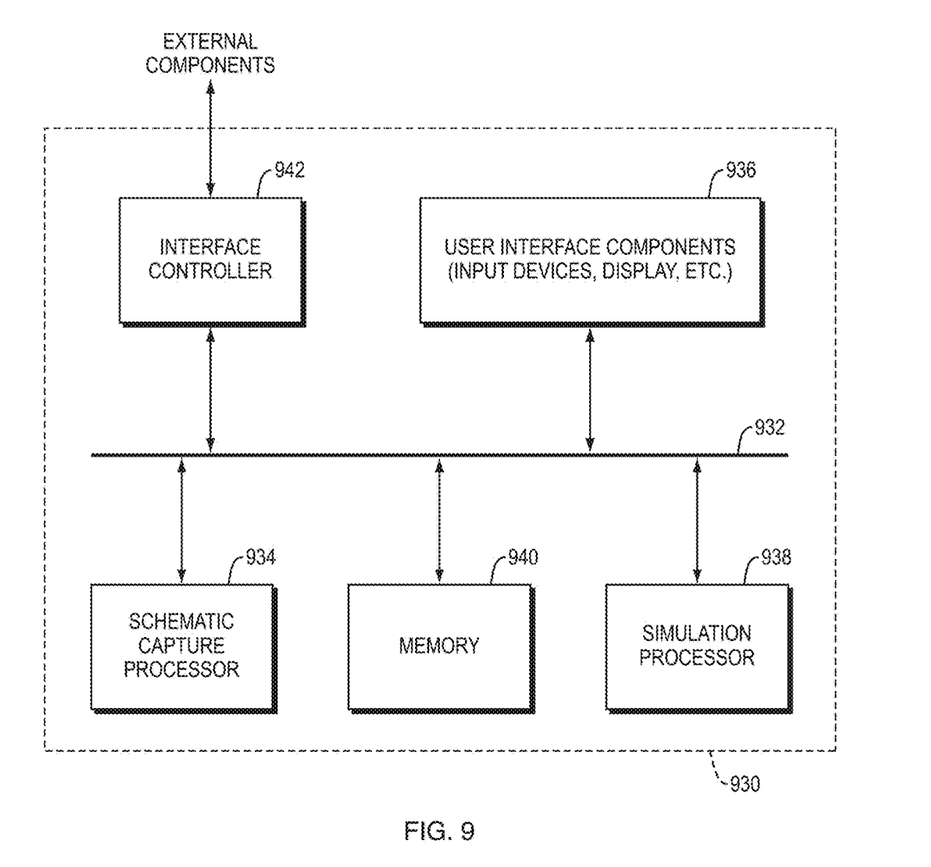
FIG. 9 illustrates an example CAD system according to the described embodiments.

FIG. 9 illustrates an example CAD system 930 according to the described embodiments. The example CAD system includes a bus 932 through which other components of the system communicate with one another. The schematic capture processor 934 provides the processing capability for generating the structural model from instructions received from the user through the user interface components 936. The simulation processor 938 provides the processing capability for executing the simulations described herein. Both the schematic capture processor 934 and the simulation processor 938 communicate through the bus 932 with memory 940, which stores instructions to be run by the processors 934, 938, and provides data storage services required by the processors. Other functions performed by the CAD system 930 may be accomplished by either of the processors or by a combination of both, or by another processor (not shown), alone or combined with the other processors. The CAD system may also include an interface controller 942 for facilitating communications with entities outside of the CAD system, such as external memory, other CAD workstations, or network components.

While this invention has been particularly shown and described with references to example embodiments thereof, it will be understood by those skilled in the art that various changes in form and details may be made therein without departing from the scope of the invention encompassed by the appended claims.

What is claimed is:

1. A method of executing a simulation model while generating an associated structural model, comprising:
   by a computer-aided design (CAD) system:
   changing the structural model, the structural model characterizing a three-dimensional spatial structure of an object, and the simulation model describing a behavior of the structural model;
   evaluating at least one trigger criterion to determine if the change to the structural model is a simulation trigger event;
   executing the simulation model if the change to the structural model is determined to be the simulation trigger event;
   presenting, upon completion of executing the simulation model, results of the execution, the results comprising whether or not the simulated model violates a predefined design constraint, a key result plot, and a pass/fail visual indication.

2. The method of claim 1, wherein the results of the execution includes a summary result, and wherein the summary result expands to a detailed result upon input from a user.

3. The method of claim 1, wherein changing the structural model is based on one or more instructions from an instruction set of the CAD system.

4. The method of claim 1, wherein the simulation trigger event includes completion of constructing the at least a portion of the structural model.

5. The method of claim 1, wherein the simulation trigger event includes one or more geometry changes.

6. The method of claim 1, wherein the executing begins at a time based on when an Nth trigger event occurs, where N is an integer.

7. The method of claim 1, wherein the executing begins at a time based on when an Nth geometry change occurs, where N is an integer.

8. The method of claim 1, further including controlling the simulation model according to a set of predetermined rules.

9. The method of claim 8, wherein the set of predetermined rules relate to when the simulating should end.

10. The method of claim 1, further including managing simulation results produced by executing the simulation model.

11. A computer-aided design (CAD) system, comprising:
    a schematic capture processor configured to change a structural model, the structural model characterizing a three-dimensional spatial structure of an object;
    a simulation processor configured to:
    evaluate at least one trigger criterion to determine if the change to the structural model is a simulation trigger event; and execute a simulation model if the change to the structural model is determined to be the simulation trigger event, beginning at a time based on the trigger event, the simulation model describing a behavior of the structural model;

present, upon completion of executing the simulation model, results of the execution, the results comprising whether or not the simulated model violates a predefined design constraint, a key result plot, and a pass/fail visual indication.

12. The CAD system of claim 11, wherein the results of the execution includes a summary result, and wherein the summary result expands to a detailed result upon input from a user.

13. The CAD system of claim 11, wherein a change to the structural model is based on one or more instructions from an instruction set of the CAD system.

14. The CAD system of claim 11, wherein the simulation trigger event includes completion of constructing the at least a portion of the structural model.

15. The CAD system of claim 11, wherein the simulation trigger event includes one or more geometry changes.

16. The CAD system of claim 11, wherein an executing of the simulation model begins at a time based on when an Nth trigger event occurs, where N is an integer.

17. The CAD system of claim 15, wherein an executing of the simulation model begins at a time based on when an Nth geometry change occurs, where N is an integer.

18. The CAD system of claim 11, wherein the simulation processor is further configured to control the simulation model according to a set of predetermined rules.

19. A non-transitory computer-readable medium with computer code instruction stored thereon, the computer code instructions when executed by a processor cause a computer-aided design (CAD) system to:

change a structural model, the structural model characterizing a three-dimensional spatial structure of an object;

evaluate at least one trigger criterion to determine if the change to the structural model is a simulation trigger event;

execute a simulation model associated with the structural model if the change to the structural model is determined to be the simulation trigger event, the simulation model describing a behavior of the structural model;

present, upon completion of executing the simulation model, results of the execution, the results comprising whether or not the simulated model violates a predefined design constraint, a key result plot, and a pass/fail visual indication.

* * * * *